(12) United States Patent
Zhi et al.

(10) Patent No.: US 11,322,312 B2
(45) Date of Patent: May 3, 2022

(54) ENERGY STORAGE DEVICE AND A METHOD OF PREPARING THE SAME

(71) Applicant: City University of Hong Kong, Kowloon (HK)

(72) Inventors: Chunyi Zhi, New Territories (HK); Yukun Wang, Shatin (HK); Hongfei Li, Kowloon Tong (HK); Zijie Tang, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 26 days.

(21) Appl. No.: 16/369,040

(22) Filed: Mar. 29, 2019

(65) Prior Publication Data

US 2020/0312579 A1 Oct. 1, 2020

(51) Int. Cl.
*H01G 11/56* (2013.01)
*H01G 11/86* (2013.01)
*H01G 11/48* (2013.01)

(52) U.S. Cl.
CPC .............. *H01G 11/56* (2013.01); *H01G 11/48* (2013.01); *H01G 11/86* (2013.01)

(58) Field of Classification Search
CPC ......... H01G 11/56; H01G 11/86; H01G 11/48
USPC ........................................................ 361/502
See application file for complete search history.

(56) References Cited

FOREIGN PATENT DOCUMENTS

CN 107481869 A * 12/2017

OTHER PUBLICATIONS

Zhu M, et al. A Highly Durable, Transferable, and Substrate-Versatile High-Performance All-Polymer Micro-Supercapacitor with Plug-and-Play Function. Advanced Materials, 2017.
Chen Q, et al. A Novel Design Strategy for Fully Physically Linked Double Network Hydrogels with Tough, Fatigue Resistant, and Self-Healing Properties. Advanced Functional Materials, 2015.
Chen Q, et al. A robust, one-pot synthesis of highly mechanical and recoverable double network hydrogels using thermoreversible sol-gel polysaccharide. Advanced Materials, 2013.

* cited by examiner

*Primary Examiner* — Arun Ramaswamy
(74) *Attorney, Agent, or Firm* — Renner Kenner Greive Bobak Taylor & Weber

(57) ABSTRACT

An energy storage device and a method of fabricating such energy storage device. The energy storage device includes a first electrode, a second electrode, and an electrolyte. The combination of the electrodes and the electrolyte is arranged to elastically deform when subjected to an external mechanical load applied to the energy storage device. The electrolyte includes a polymer matrix of at least two crosslinked structures, including a first polymeric material and a second polymeric material; and an electrolytic solution retained by the polymer matrix.

12 Claims, 19 Drawing Sheets

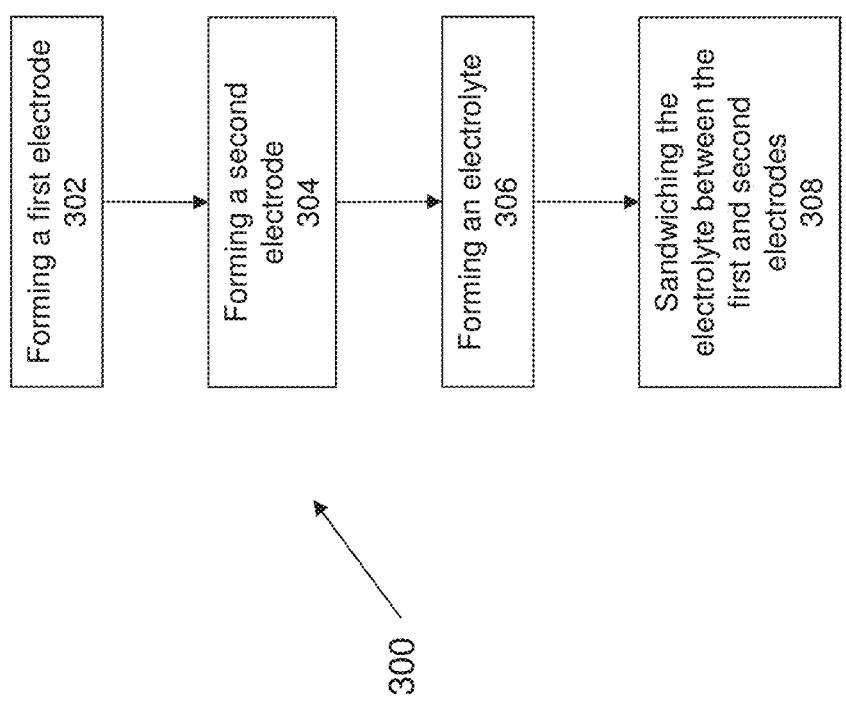

3*3 cm ppy film

Thickness of 5 layers

Photo of ppy film with different deposition time

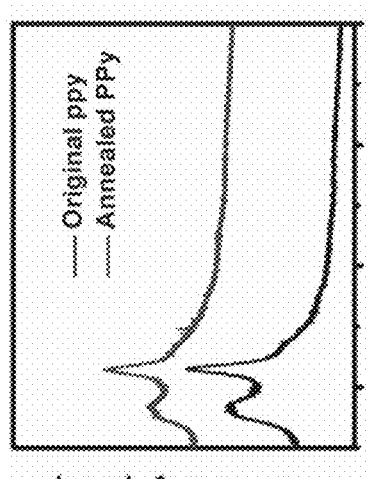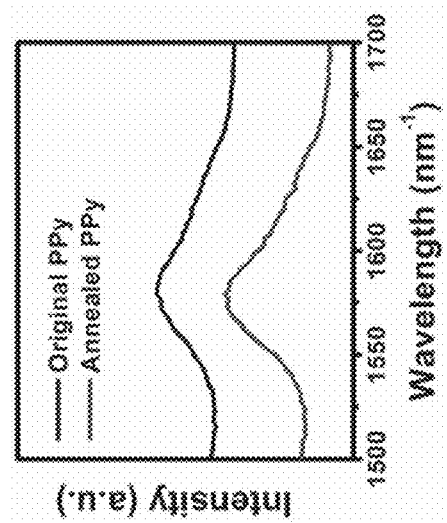
Fig. 10A  Fig. 10B  Fig. 10C  Fig. 10D

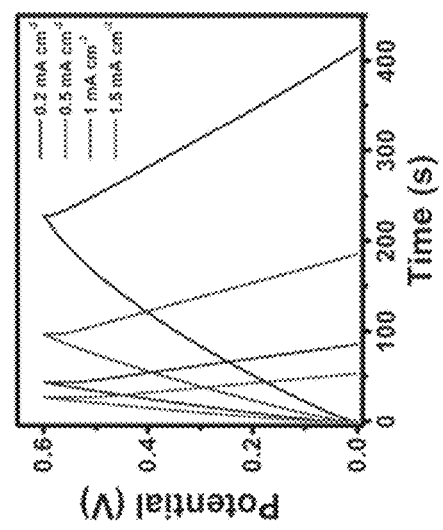
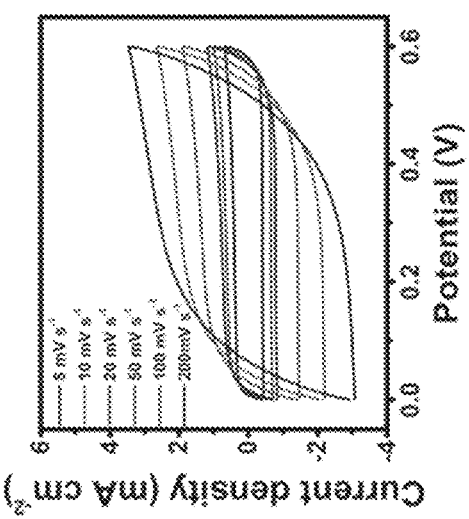
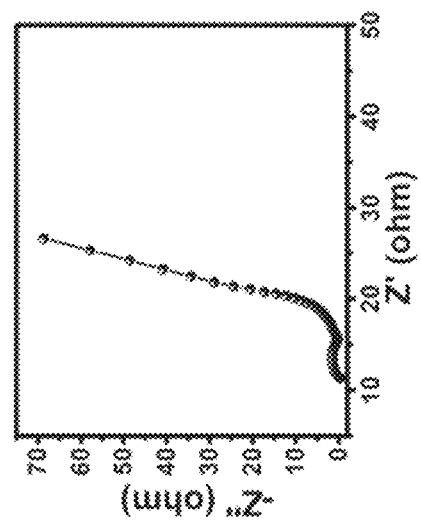
Fig. 11A
Fig. 11B
Fig. 11C

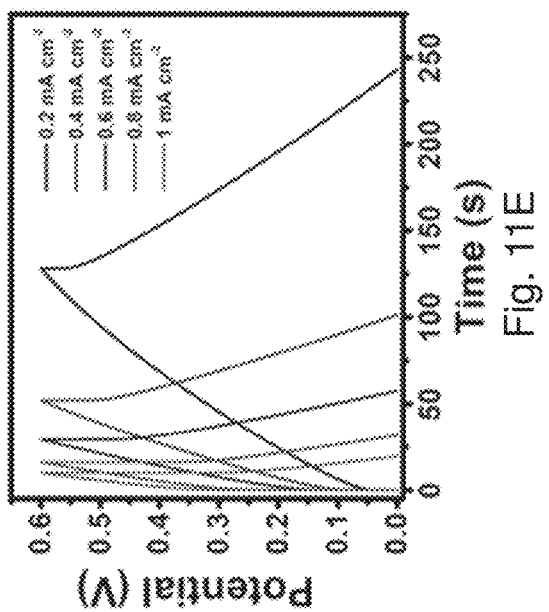
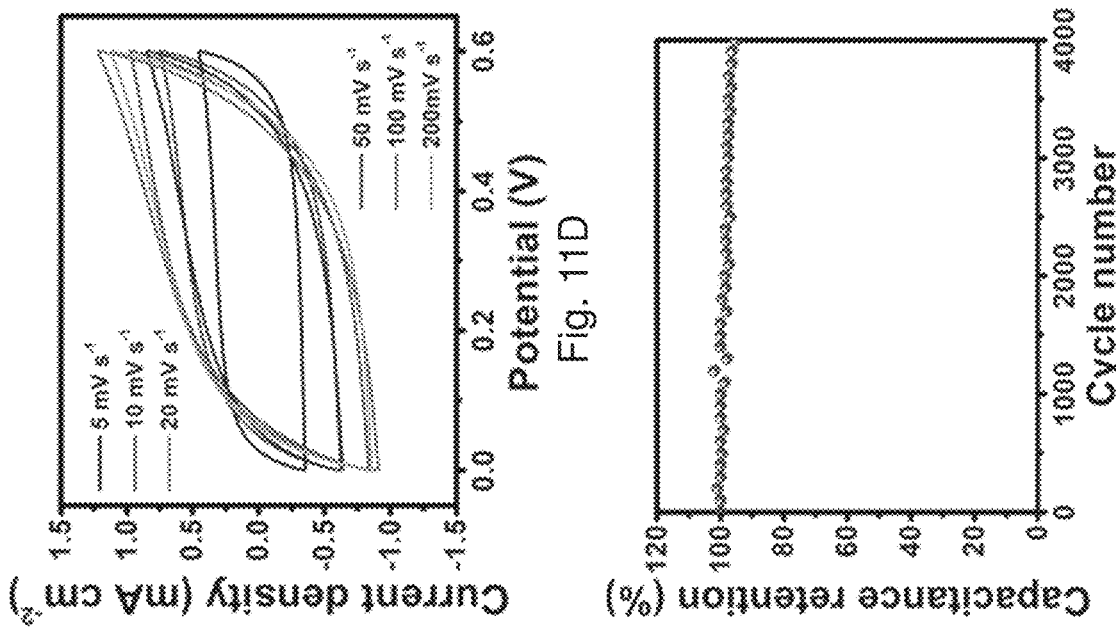

ENERGY STORAGE DEVICE AND A METHOD OF PREPARING THE SAME

TECHNICAL FIELD

The present invention relates to an energy storage device and a method of preparing the same, in particular, but not exclusively, to an energy storage device that can elastically deform upon subjecting to an external mechanical load.

BACKGROUND

Flexible and wearable devices are growing in use and are starting to become more mainstream. Flexible and wearable devices are being incorporated into wearable products that are also starting to become more popular and are starting to gain wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an energy storage device, comprising: a first electrode and a second electrode sandwiching an electrolyte therebetween, wherein the electrolyte includes a polymer matrix including at least two crosslinked structures having a first polymeric material and a second polymeric material; and an electrolytic solution retained by the polymer matrix; wherein the combination of the first electrode, the second electrode and the electrolyte is arranged to elastically deform when subjected to an external mechanical load applied thereto.

In an embodiment of the first aspect, the at least two crosslinked structure includes a first crosslinked structure defined by a plurality of polymer chains of the first polymeric material that form a first physical crosslink between each adjacent pair of polymer chains of the first polymeric material.

In an embodiment of the first aspect, the first physical crosslink includes at least one hydrogen bond formed between each adjacent pair of polymer chains of the first polymeric material.

In an embodiment of the first aspect, the at least two crosslinked structure includes a second crosslinked structure defined by a plurality of polymer chains of the second polymeric material that form a second physical crosslink between each adjacent pair of polymer chains of the second polymeric material.

In an embodiment of the first aspect, the second physical crosslink further includes a crosslinking agent forming at least one hydrophobic interaction with the adjacent pair of polymer chains of the second polymeric material.

In an embodiment of the first aspect, the at least two crosslinked structure includes a third crosslinked structure including at least a third physical crosslink formed between adjacent pairs of polymer chains of the first and the second polymeric materials.

In an embodiment of the first aspect, the third physical crosslink includes at least one hydrophobic interaction formed among the adjacent pairs of polymer chains of the first polymeric material and the second polymeric material, and the crosslinking agent.

In an embodiment of the first aspect, the third physical crosslink includes intercrossing and intertwining between the adjacent pairs of polymer chains of the first and the second polymeric materials.

In an embodiment of the first aspect, the crosslinking agent includes a third polymeric material.

In an embodiment of the first aspect, the crosslinking agent further includes a surfactant forming a micelle with the third polymeric material.

In an embodiment of the first aspect, the third polymeric material is poly(stearyl methacrylate).

In an embodiment of the first aspect, the surfactant is sodium dodecyl sulfate (SDS).

In an embodiment of the first aspect, the second crosslinked structure dissipates energy when subjected to the external mechanical load thereby maintaining the elasticity of the electrolyte.

In an embodiment of the first aspect, the second crosslinked structure dissipates energy by rupturing the hydrophobic interactions within the structure when subjected to the external mechanical load; and restoring the interactions when the load is removed.

In an embodiment of the first aspect, the first polymeric material is polyacrylamide.

In an embodiment of the first aspect, the second polymeric material is agar.

In an embodiment of the first aspect, the first electrode is an anode including a conductive polymer.

In an embodiment of the first aspect, the second electrode is a cathode including a conductive polymer.

In an embodiment of the first aspect, the conductive polymer is selected from the group consisting of polypyrrole, polyacetylene, polyphenylene vinylene, polythiophene and polyphenylene sulfide.

In an embodiment of the first aspect, the conductive polymer is annealed to enhance electrical conductivity thereof.

In an embodiment of the first aspect, the electrolytic solution includes at least one salt or acid.

In an embodiment of the first aspect, the combination of the first electrode, the second electrode and the electrolyte elastically deforms in a way of stretching when subjected to the external mechanical load applied to thereto.

In an embodiment of the first aspect, the electrolyte substantially maintains its elasticity after subjecting to stretching for at least 500 times.

In an embodiment of the first aspect, the device substantially maintains its elasticity after subjecting to stretching for at least 500 times.

In an embodiment of the first aspect, the device is a supercapacitor.

In accordance with the second aspect of the present invention, there is provided a method of fabricating an energy storage device, comprising the steps of: forming a first electrode; forming a second electrode; forming an electrolyte which includes a polymer matrix including at least two crosslinked structures having a first polymeric material and a second polymeric material, wherein the polymer matrix retains an electrolytic solution; and sandwiching the electrolyte between the first electrode and the second electrode; wherein the combination of the first electrode, the second electrode and the electrolyte is arranged to elastically deform when subjected to an external mechanical load applied thereto.

In an embodiment of the second aspect, the method further comprises the step of stretching the electrolyte with a pre-determined length prior to the step of sandwiching the electrolyte between the electrodes.

In an embodiment of the second aspect, the step of forming at least one of the first or the second electrode includes the step of annealing a conductive polymer film at a predetermined temperature to increase the conductivity of the electrodes.

In an embodiment of the second aspect, the step of forming at least one of the first or the second electrode includes the step of includes the steps of: electrodepositing a conductive polymer on a substrate to form the conductive polymer film on the substrate; and removing the conductive polymer film from the substrate in an alcoholic solution.

In an embodiment of the second aspect, the step of forming the electrolyte includes the step of curing a precursor of the first polymeric material to form a first crosslinked structure in the polymer matrix.

In an embodiment of the second aspect, the step of forming the first crosslinked structure includes the steps of: heating the precursor of the first polymeric material to obtain a solution thereof; cooling the solution to obtain polymer chains of the first polymeric material forming the first crosslinked structure.

In an embodiment of the second aspect, the step of forming the electrolyte includes the step of forming a second crosslinked structure by polymerizing a monomer of the second polymeric material, an initiator, and a crosslinking agent.

In an embodiment of the second aspect, the step of forming the second crosslinked structure includes the step of curing the monomer of the second polymeric material, the initiator, and the crosslinking agent under an UV exposure.

In an embodiment of the second aspect, the step of forming the electrolyte includes the step of soaking the polymer matrix into an aqueous electrolytic solution.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 3 shows an embodiment of a method of forming the energy storage device of FIG. 1;

FIG. 10A is a plot of heat flow against temperature showing a DSC curve of the electrodeposited PPy film revealing a glass transition temperature of 228° C.;

FIG. 10B is an XRD spectra of the PPy film before and after annealing;

FIG. 10C is a Raman spectra of the PPy film before and after annealing;

FIG. 10D is an enlarged Raman spectra of FIG. 10C showing the peaks at around 1600 $cm^{-1}$;

FIG. 11A is a cyclic voltammogram showing the CV curves of the symmetrical supercapacitor in 1M $H_2SO_4$ solution at different scan rates;

FIG. 11B is a plot of potential against time showing the GCD curves of the symmetrical supercapacitor in 1M $H_2SO_4$ solution at different current densities;

FIG. 11C is an EIS spectra of the symmetrical supercapacitor in 1M $H_2SO_4$ solution;

FIG. 11D is a cyclic voltammogram showing the CV curves of the annealed PPy film paved on the agar/HPAAm hydrogel electrolyte;

FIG. 11E is a plot of potential against time showing the GCD curves of the annealed PPy film paved on the agar/HPAAm hydrogel electrolyte;

FIG. 11F is a plot of capacitance against cycle number showing the cyclic performance of the annealed PPy film paved on the agar/HPAAm hydrogel electrolyte;

DETAILED DESCRIPTION OF THE PREFERRED EMBODIMENTS

Figure 1:
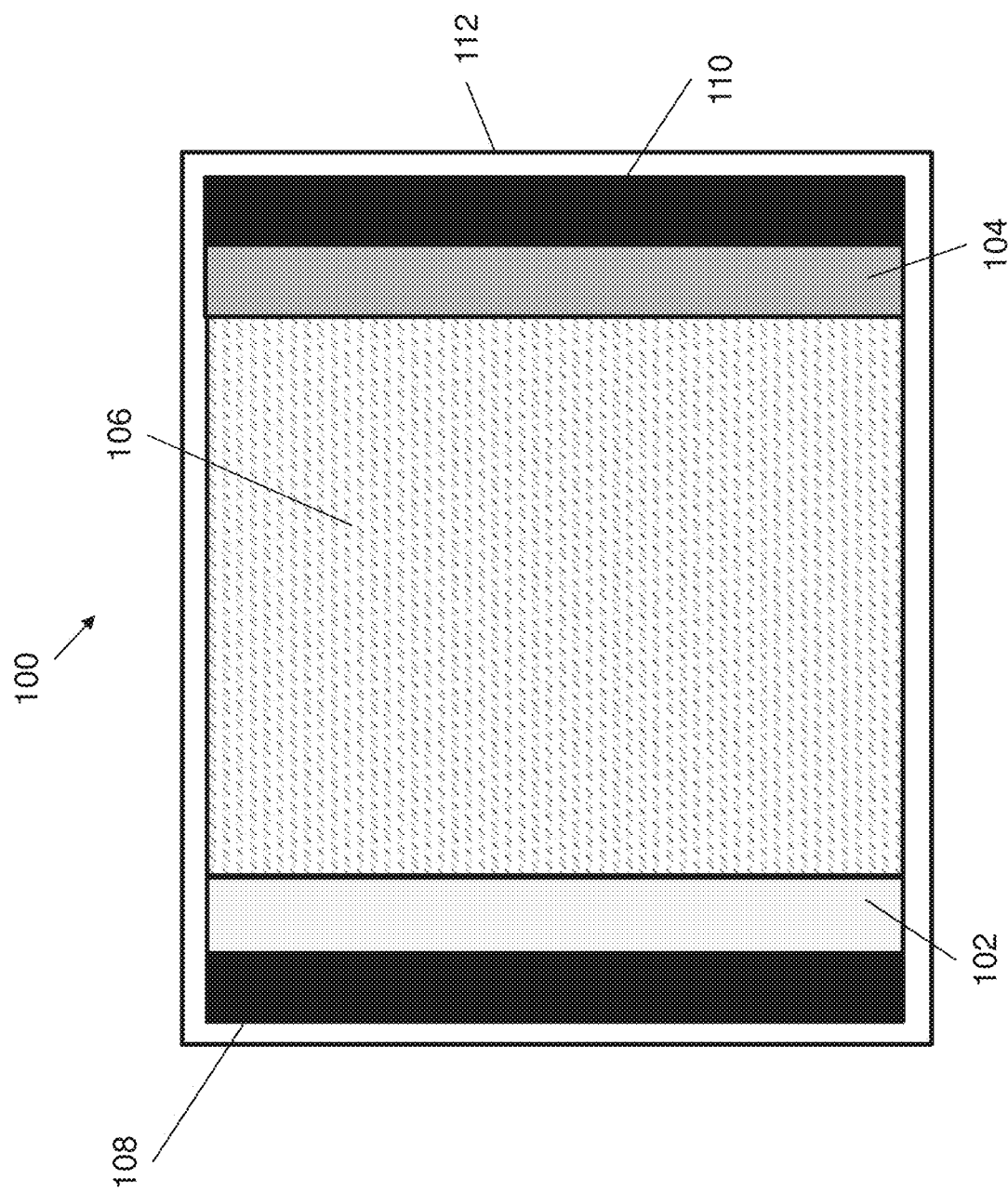
FIG. 1 illustrates of an energy storage device in accordance with an embodiment of the present invention.

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for wearable electronics is supercapacitors. Supercapacitors may have advantages of for example high power density, fast charge-discharge rates and a relatively longer life cycle than certain types of batteries, rendering supercapacitors highly desirable in wearable electronics in addition to some particular batteries.

It is appreciated that human bodies and organs are soft, curved, and constantly moving, flexible and wearable devices will therefore experience various mechanical forces during routine use. For example, it is unavoidable to experience a series of stretching forces when a user wears a cloth. Thus, it may be preferable to have a supercapacitor that can endure multiple stretching.

A "stretchable material" may refer to a material that is capable of being elongated when it is subjected to a pulling force applied on its edges. Upon removal of the pulling force, the material may either completely return to its original state or to its original state with some degrees of residual strain (i.e. the restoration is incomplete). In other words, a stretchable material may be further classified into "elastically stretchable" and "inelastically stretchable" based on the completeness of length restoration of the material.

The inventors devised that many of the stretchable supercapacitors may only be stretched a few times and no longer maintain their elasticity afterwards. In addition, the elasticity of supercapacitors may be deteriorated on the one hand when the supercapacitors comprise electrode materials containing inorganic materials; and on the other hand the electrolyte, particularly the hydrogel electrolyte, may not have the capability to incorporate a high water content and salt. As a result, these supercapacitors may not be able to provide a satisfactory electrochemical performance and long-term usage. Thus, it may be preferable to provide an energy storage device with a stable electrochemical performance while subjecting to repeated stretching, and the elasticity of device is maintained thereafter.

In accordance with an example embodiment of the present invention, there is provided an energy storage device with excellent elasticity and stretchability. The device may be capable of enduring a stretch-recovery cycle for 1000 times with no obvious electrochemical performance degradation and strain residue. The device may include a pair of electrodes and an electrolyte that are highly elastic. Preferably, the electrolyte may be arranged to dissipate the mechanical energy when it is subjected to external mechanical loads, and therefore in combination with the elastic electrodes, enhancing the elasticity, stretchability, and durability of the device.

With reference to FIG. 1, there is shown an exemplary embodiment of an energy storage device 100. The energy storage device 100 may be of any form that can capture energy produced at one time for use at a later time. In this example, the energy storage device includes a capacitor structure, which may be used as a "supercapacitor". The supercapacitor 100 may be of any suitable form that fits a particular application, such as flat-shaped, fiber-shaped, twisted fiber-shaped etc. Regardless of the shape of the supercapacitor, the supercapacitor may be substantially arranged to elastically deform and dissipate mechanical energy upon subjecting to external mechanical loads while maintaining the electrochemical performance.

In this embodiment, the supercapacitor 100 comprises a first electrode 102 and a second electrode 104 being spaced apart from each other and an electrolyte 106 disposed between the first electrode 102 and the second electrode 104. An electrolyte 106 is sandwiched between and is electrically coupled with the first electrode 102 and the second electrode 104.

Optionally, the supercapacitor 100 may also include substrates 108, 110 which may provide mechanical supports to the anode and/or the cathode electrodes 102, 104. The substrates may also operate as a current collector to associate with the first electrode 102 and the second electrode 104 respectively. For example, the substrates may be electrically conductive and may be bonded to external electrical wires to deliver electrical energy to external electronic devices. The substrates may be made of any suitable conductive materials or of the same material as the electrodes. Preferably, the substrates may be of certain elasticity thereby enhancing the overall elasticity of the supercapacitor.

The supercapacitor 100 may optionally include an encapsulation 112 that receives and encases the first electrode 102, second electrode 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the first electrode 102 functions as an anode and the second electrode 104 functions as a cathode of the supercapacitor 100. It is appreciated that the arrangement of the anode and cathode may be reversible. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement depending on the desired shape of the supercapacitor 100.

With reference to FIG. 1, each the first electrode 102 (i.e. anode) and the second electrode 104 (i.e. cathode) may comprise a layer conductive material, such as a conductive polymer. The first electrode 102 and the second electrode 104 may or may not comprise a conductive polymer of the same type. Any suitable conductive polymer having certain elasticity may be used as an electrode of supercapacitor 100. In one example, the conductive polymer is polypyrrole (PPy). Alternatively, the conductive polymer may be selected from polyacetylene, polyphenylene vinylene, polythiophene or polyphenylene sulfide. The soft and elastic nature of the conductive polymer may facilitate the geometry recovery of the supercapacitor after the removal of applied force.

Preferably, the conductive polymer may be an annealed polymer. After annealing, the polymer may have a more regular polymeric structure, for example a more regular polymer chain arrangement, thereby enhancing the electrical conductivity of the electrodes.

Alternatively, other flexible conductors, such as graphene or metal foils with or without additional layer of conductive material coated thereon, may be used as electrodes in the supercapacitor.

The electrolyte 106 may be a polymeric electrolyte disposed between the first electrode 102 and the second electrode 104. The polymeric electrolyte 106 may be a hydrogel electrolyte that is viscous enough to be formed into a shape and retain the shape it is formed into. For example, the electrolyte 106 may be formed into any one of an elongated shape, a planar shape, a tubular shape, or any suitable shape. The electrolyte 106 is also capable of being retained within the supercapacitor 100 by being sandwiched between the electrodes 102 and 104. In other words, the electrodes 102 and 104 are disposed on opposite sides of the electrolyte 106.

The electrolyte 106 is arranged to elastically deform in combination with the electrodes 102, 104 when subjected to an external mechanical load applied to the supercapacitor 100, thereby allowing the supercapacitor 100 to maintain its electrochemical performance. For example, the supercapacitor 100 may elastically deform in a way of stretching upon subjecting to repeated stretch-release cycles such as 500, 800, 1000 cycles. That is, the elasticity of the supercapacitor is maintained after the stretch-release cycles. Meanwhile, the electrochemical performance such as capacitance is maintained.

Figure 2A:
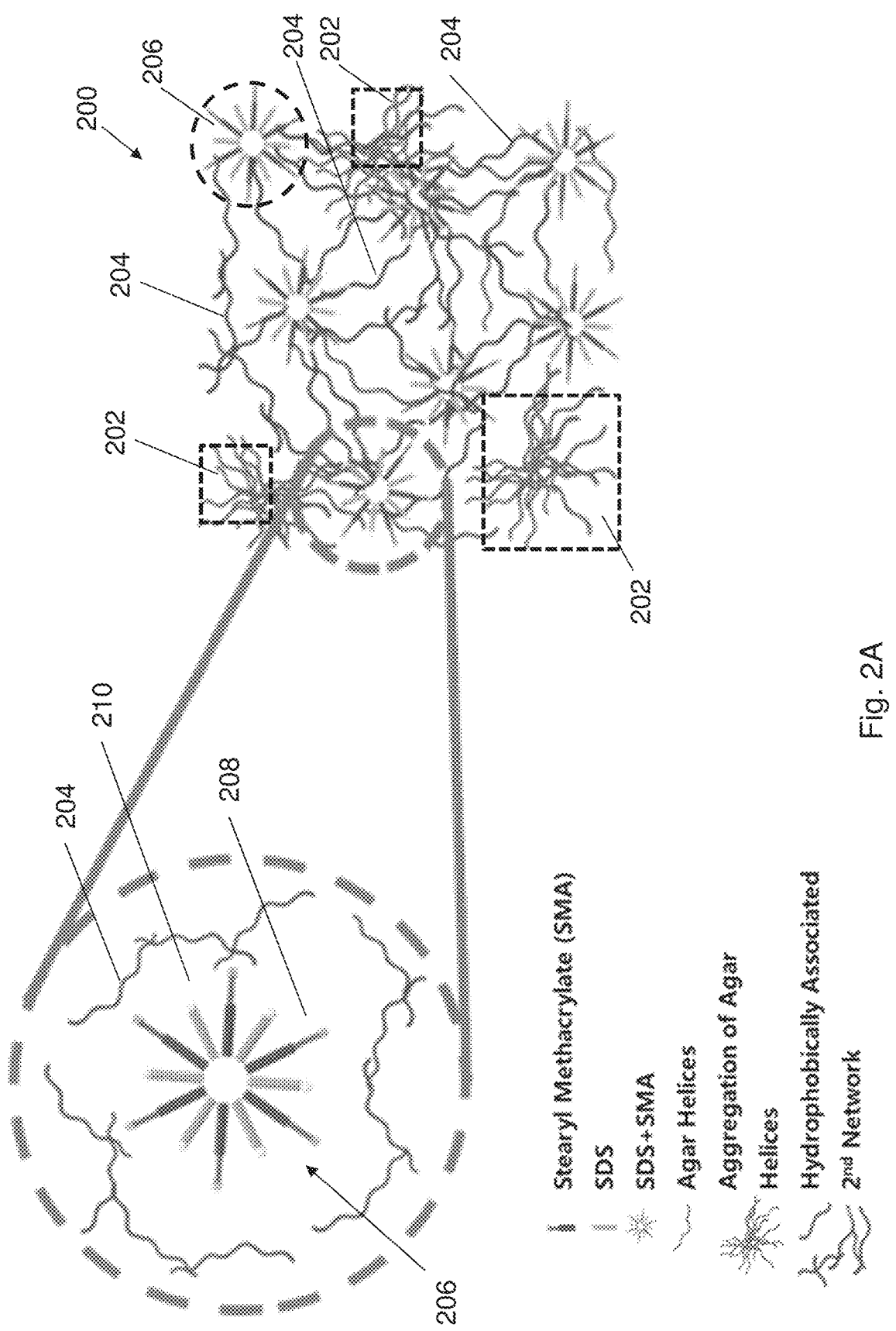
FIG. 2A illustrates the crosslinked structures within the electrolyte of the energy storage device of FIG. 1.

With reference to FIG. 2A, the electrolyte 106 comprises a polymer matrix 200 including at least two crosslinked structures having a first polymeric material and a second polymeric material. In this example, the first and the second polymeric materials are agar and polyacrylamide (PAAm) respectively, which combine and form a hydrogel material that may be used as an electrolyte in a supercapacitor.

Preferably, the polymer matrix may include at least a first crosslinked structure and a second crosslinked structure. Each of the crosslinked structures may be defined by a plurality of intra-/inter-molecular attractions of the first or the second polymeric material. For example, the polymer chains in the polymer matrix may interact with each other so as to allow the electrolyte to elastically deform and dissipate mechanical energy upon subjecting to an external mechanical load applied to the polymer matrix.

Referring to FIG. 2A, the first crosslinked structure is defined by a plurality of polymer chains of the first polymeric material 202 that form a first physical crosslink between each adjacent pair of polymer chains of the first polymeric material 202. The first physical crosslink may include at least one hydrogen bond formed between each of the adjacent pair of polymer chains of the first polymeric material 202.

For example, the hydrogen bonds may be formed between the repeating unit of each of the adjacent pair of polymer chains of the first polymeric material 202 or agar. In this way, the plurality of polymer chains of the first polymeric material (i.e. individual agar helices) may be aggregated to form a bulk structure having the first crosslinked structure (i.e. network) therein.

The second crosslinked structure is defined by a plurality of polymer chains of the second polymeric material 204 that form a second physical crosslink between each adjacent pair of polymer chains of the second polymeric material 204. Referring to FIG. 2A, individual polyacrylamide (PAAm) chains link together to form a second polymer network. The second polymer network intercrosses with the first network that provides the hydrogel with a deformable/stretchable property.

Preferably, the second physical crosslink further includes a crosslinking agent 206 forming at least one hydrophobic interaction with the adjacent pair of polymer chains of the second polymeric material 204. The crosslinking agent 206 may further facilitate the crosslinking attractions between individual PAAm chains to form the second network.

Preferably, the crosslinking agent 206 may include a third polymeric material 208 which has a micelle structure that is formed due to a hydrophobic interaction among hydrophobic functional groups in multiple polymer chains. For example, the micelle may be formed by poly(stearyl methacrylate) (poly-SMA) and a surfactant 210 or sodium dodecyl sulfate (SDS).

The third polymeric material 208 and the surfactant 210 may combine to form a polymerizable micelle with strong hydrophobic interactions therein and interacts reversibly with the adjacent pair of polymer chains of the second polymeric material 204 or PAAm to form the second crosslinked structure (i.e. network). Such reversible interaction may contribute to elasticity of the electrolyte 106, which will be discussed later.

Preferably, strong hydrophobic interactions may be provided between the alkyl groups of poly-SMA and SDS, interacting with the polymer chains of PAAm, thereby forming the second crosslinked structure.

Alternatively, the adjacent pair of polymer chains of the second polymeric material 204 may be crosslinked by one or more crosslinking agents of other suitable types, which may further enhance the robustness of the second crosslinked structure. The expression "other suitable types" is by meant that the crosslinking agents may include other suitable types of polymeric materials and surfactants.

Optionally or additionally, the polymer matrix 200 may further include a third crosslinked structure, which may include a network formed by a third physical crosslink formed between adjacent pairs of polymer chains of the first polymeric material 202 and the second polymeric material 204. The physical crosslink, for example, may include any reversible crosslinking interaction known in the art such as chain entangling, hydrogen bond, hydrophobic interaction, crystallite formation, etc. Preferably, the physical crosslink includes hydrophobic interactions formed between the first and the second crosslinked structures, the intercrossing and intertwining between the adjacent pairs of polymer chains of the first and the second polymeric materials or the combination thereof.

Preferably, the hydrophobic interactions may involve a crosslinking agent between the first and the second crosslinked structures. That is, the hydrophobic interaction is formed among the adjacent pairs of polymer chains of the first polymeric material and the second polymeric material, and the crosslinking agent, thereby allowing the first and the second crosslinked structures to infiltrate into each other.

Preferably, the crosslinking agent 206 may also facilitate the formation of the third polymer network. For example, the strong hydrophobic interactions between alkyl groups of SMA and SDS micelles allow these two crosslinked networks to infiltrate into each other.

Referring to FIG. 2A, there is shown an example structure of electrolyte 106 formed with polymer chains forming different crosslinked structures within the electrolyte. The electrolyte 106 comprises a polymer matrix including three crosslinked networks. In this example, the polymer matrix includes a first crosslinked structure, a second crosslinked structure and a third crosslinked structure. Each of the crosslinked structures are defined by a plurality of polymer chains of agar (i.e. the first polymeric material) or polyacrylamide (PAAm) (i.e. the second polymeric material).

The first crosslinked structure includes a plurality of agar chains crosslinked together by forming hydrogen bonds between each pair of adjacent agar chains, forming an aggregated network.

The second crosslinked structure includes a plurality of PAAm chains crosslinked together by forming hydrophobic interactions with a crosslinking agent comprising polymerizable micelle. Preferably, the micelle includes a polymeric material of poly-SMA and a surfactant of SDS. The alkyl groups of the poly-SMA and the SDS provide strong hydrophobic interaction that interacts with the PAAm chains, forming the second crosslinked structure (i.e. HPAAm structure/network).

The hydrophobic interaction may act as a reversible crosslinking point that can dynamically break/rupture and reform/restore to facilitate mechanical energy dissipation upon subjecting to external mechanical loads. In addition, as shown in FIG. 2A, the agar structure (i.e. network) infiltrates into the PAAm structure (i.e. network) by either forming hydrophobic interactions through the crosslinking agent or by intercrossing and intertwining with each other, forming the third crosslinked structure (i.e. network).

As mentioned above, the electrolyte 106 may be arranged to elastically deform and dissipate mechanical energy when subjecting to external mechanical loads applied thereonto. This may be accounted for by the hydrophobic interactions within the aforementioned crosslinked structures of the electrolyte.

Figure 2B:
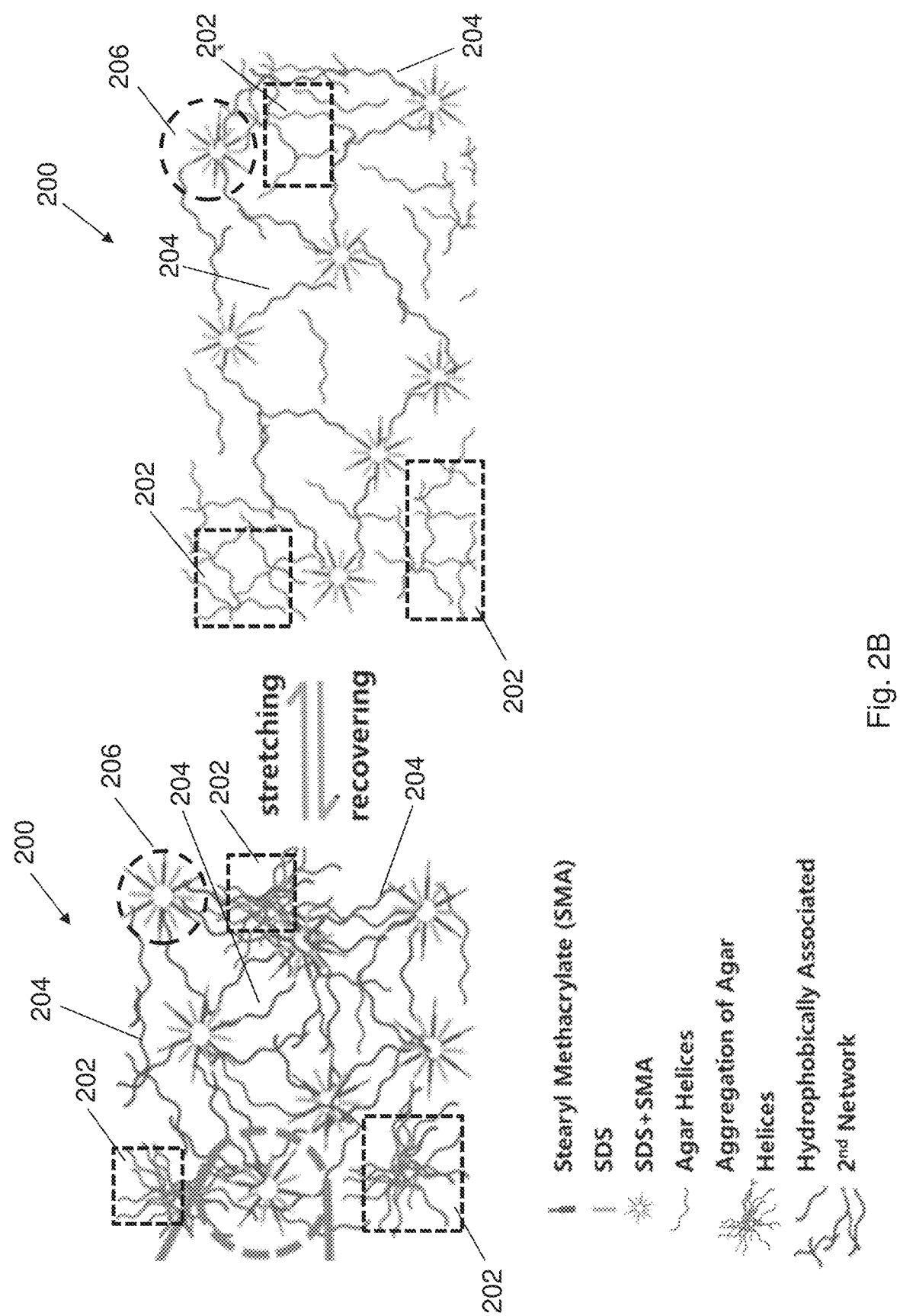
FIG. 2B illustrates the crosslinked structures within the electrolyte of the energy storage device of FIG. 1 upon subjecting to or being released from stretching.

Referring to FIG. 2B, when stress (i.e. stretching force) is induced within the polymer matrix 200, the polymer chains of the first polymeric material 202 may be pulled apart from the aggregated first crosslinked structure. The polymer chains of the first polymeric material 202 may retain within the crosslinked structure and therefore the integrity of the first crosslinked structure may be maintained even under the stress condition. At the same time, the hydrophobic interactions within the second crosslinked structure may be ruptured such that the applied stress and therefore the mechanical energy may be shared and alleviated among the whole polymer matrix.

For example, during the stretching process, the agar network does not fracture into small chains. Instead, the agar chains would be pulled out from the aggregated agar helical bundles in turn, dissipating the external mechanical energy applied thereon without collapsing the network. At the same time, the second HPAAm network could share the stress through the chain, as well as providing the self-healing performance.

When the stress is removed, the polymer chains of the second polymeric material 204 may restore the hydrophobic interactions with the crosslinking agent 206 in a short period of time so as to reconstruct the second crosslinked structure. At the same time, this may bring the polymer chains of the first polymeric material 202 together and may interact with the reconstructed second crosslinked structure such that the first and the additional third crosslinked structures may be restored simultaneously. In this way, the elasticity of the electrolyte 106 may be maintained upon subjecting to repeated stretching for, for example, 500 times or even more.

The polymeric matrix 200 is arranged to retain an electrolytic solution therein for ion conductivity. The electrolytic solution may include at least one salt or an acid as additives within the electrolytic solution. In one example, the electrolytic solution may include $H_2SO_4$ as the additive there-within. A skilled person may recognize any other electrolytic solutions including suitable salts or acids according to their needs.

As mentioned above, the crosslinked structures may interact dynamically to dissipate external mechanical energy so as to render the electrolyte excellent elasticity and stretchability. When stress is induced in the polymer matrix, the agar chains within the highly aggregated agar structure may be pulled out therefrom with the overall agar structure remains intact. That is, the agar chains may not fracture into small chains but remain interacting with each other, forming a comparably less aggregated structure. Therefore, the agar structure is not collapsed under the stress condition.

Meanwhile, the hydrophobic interactions of the crosslinked PAAm structure may break in response to the applied mechanical loads, which in turn sharing the energy over a large area within the polymer matrix, facilitating energy dissipation. When the stress is released, the PAAm structure may be reconstructed within a short period of time by restoring the hydrophobic interactions within the structure. At the same time, as the agar chains may become proximate to each other as well as to the PAAm structure again, the agar structure and the crosslinked structure of the PAAm and the agar structures may be reformed. Thus, the original structure of electrolyte may be restored.

Compared with other chemically linked or hybrid linked dual network (DN) hydrogels, the Agar/HPAAm DN hydrogel is formed mainly by physically linkages with no chemical crosslinks contained. Though the single HPAAm network is weak with a relatively low strength, it has a self-recovery property facilitated by the reversible hydrophobic interactions of the different polymer networks, which improves the mechanical performance, especially the elasticity of the hydrogel.

This may be also advantageous as the electrolyte may show excellent elasticity in response to repeated stretching, thereby enhancing the durability of the electrolyte and therefore the energy storage device containing such electrolyte. Examples of elasticity and stretchability of the supercapacitor 100 or the polymer matrix 200 will be further discussed in the later parts of disclosure.

The polymer matrix 200 also includes a plurality of positive ions and negative ions within the matrix. These ions are obtained from the electrolytic solution including $H_2SO_4$ retained by the matrix. The positive ions (i.e. the proton, $H^+$) and negative ions ($SO^{4-}$) may move freely within the electrolyte. In particular, the positive and the negative ions may fill and move freely through the micropores of the electrolyte, thereby allowing the electrolyte being conductive. As appreciated by a person skilled in the art, chemical ions or metal ions of other combinations may be trapped in the hydrogel structure when a different electrolytic solution is retained in the polymer matrix.

With reference to FIG. 3, there is shown a method 300 of forming an energy storage device that comprises the aforementioned electrodes and electrolyte, where the combination of which is arranged to elastically deform when subjected to an external mechanical load applied thereto. The method 300 is an exemplary method of forming a supercapacitor that includes the aforementioned electrodes and electrolyte and has a strengthened elasticity, stretchability, and durability in response to external mechanical loads.

The method commences at step 302. Step 302 comprises forming or providing a first electrode. This step may be performed simultaneously with step 304 which comprises forming or providing a second electrode, such that the first and the second electrodes may be formed substantially in the same manner.

In one example, the first electrode may be an anode whereas the second electrode may be a cathode. Both of which may be formed by electrodepositing a conductive polymer, particularly a polymer selected from the group consisting of polypyrrole (PPy), polyacetylene, polyphenylene vinylene, polythiophene and polyphenylene sulfide, preferably selected from polypyrrole (PPy) onto a substrate such as an ITO glass to form a conductive polymer film of desired thickness onto the substrate. The conductive polymer film may then be removed from the substrate by immersing the as-obtained film-on-substrate structure in an alcoholic solution such as an ethanol solution.

Steps 302 and 304 may further include an annealing process. The as-obtained conductive polymer may be subjected to an annealing process at an elevated temperature, preferably slightly higher than the glass transition temperature ($T_g$) of the polymer. This process is advantageous as the polymer chains of the conductive polymer film may be rearranged into a more regular configuration, thereby facilitating and enhancing the polymer and therefore the electrodes.

Alternatively, the electrodes may be prepared by annealing the conductive polymer film obtained from any commercial or any other suitable methods.

In this example, the conductive PPy film was fabricated by an electrochemical deposition method. A mixture of 0.4M pTSA, 0.3M NaOH and 1 vol % of pyrrole monomer was used as an electrolyte for the deposition. The electrochemical deposition was conducted in a three-electrode configuration at 0° C. with a constant voltage of 0.8V for 600 s. The ITO glass, platinum mesh and saturated calomel electrode were served as the working electrode, counter electrode, and the reference electrode, respectively. After deposition, the ITO glass was immersed into ethanol for 5 min to peel off the PPy film from the substrate (ITO glass). The PPy film was dried at room temperature and then annealed at 260° C. for 30 min under the protection of $N_2$ to enhance their electrical conductivity as well as electrochemical performances.

Step 306 comprises forming an electrolyte. The electrolyte may be formed using any suitable method. In this example, the electrolyte is an agar/HPAAm hydrogel. The electrolyte preferably is formed using the same steps as method 400 that will be described later.

Step 308 comprises sandwiching the electrolyte between the first electrode and the second electrode. The combining process may depend on the shape of the supercapacitor. In one example, the supercapacitor is a flat-shaped supercapacitor. In a preferred embodiment, the electrolyte may be first pre-stretched to a predetermined strain/length. Then the electrodes are directly attached or layered on each side of the electrolyte. After that, the supercapacitor is released from stretching such that a supercapacitor with wrinkled electrode surfaces may be obtained.

In an alternative example, the electrodes rather than the electrolyte may be stretched by a predetermined strain/length prior to attaching/layering onto the electrolyte. After the attachment, the electrodes may be allowed to return to its original state from stretching, so as to form a wrinkled electrode surface on the supercapacitor.

Figure 4:
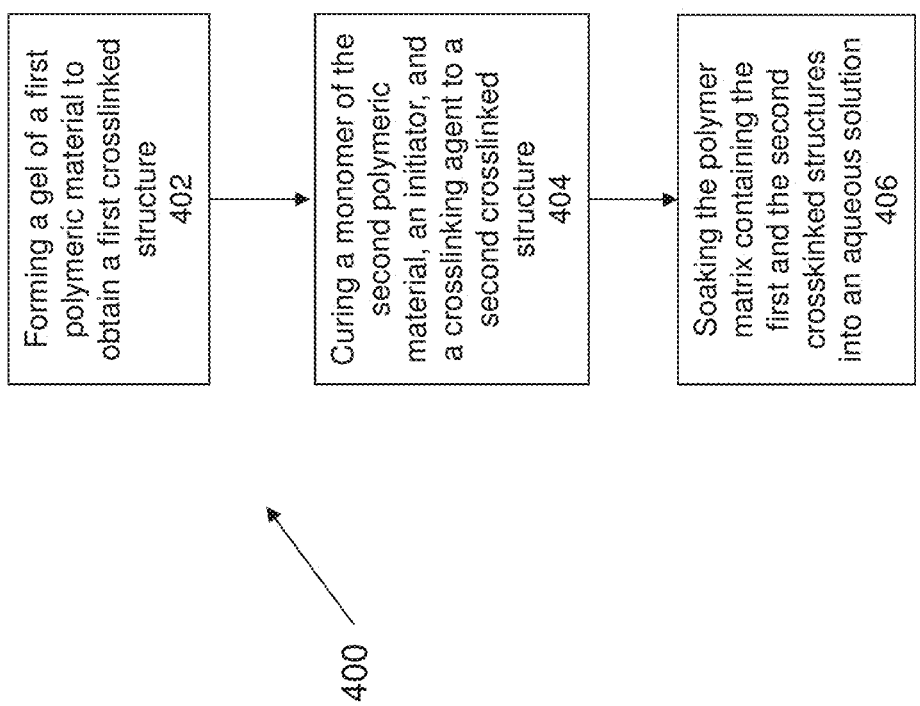
FIG. 4 shows an embodiment of a method of forming the hydrogel electrolyte in the energy storage device of FIG. 1.

With reference to FIG. 4, there is shown an example of a method 400 of forming the electrolyte 106, which includes a polymer matrix including at least two crosslinked structures having a first polymeric material and a second polymeric material. The method commences at step 402. Step 402 comprises forming a first crosslinked structure by forming a gel of the first polymeric material such as agar. The step may include heating an agar block to obtain an agar solution, followed by cooling the solution to obtain an agar gel. In this way, the agar gel may include a plurality of linear macromolecules aggregated together by hydrogen bonds, forming the first crosslinked structure.

Step 404 includes forming a second crosslinked structure by polymerizing a monomer of the second polymeric material, an initiator, and a crosslinking agent. The polymerization may involve curing the said components under UV. In one example, the monomer of the second polymeric material, the initiator, and the crosslinking agent may be acrylamide (AAm), 2-hydroxy-4'-(2-hydoxyethoxy)-2-methylpropiophenone (Irgacure 2959), and a polymerizable micelle of SMA and SDS, respectively. It is appreciated that any other suitable initiators and crosslinking agents may also be used depending on the fabrication conditions.

Preferably, the first and the second crosslinked structures may be formed in a plastic mold with an in situ manner. The aforementioned first polymeric material, monomer of the second polymeric material, the initiator, and the crosslinking agent may be heated together to form a solution. The solution may then be cooled to obtain a gel of the first polymeric material. The unreacted second polymeric material monomer, initiator, and crosslinking agent may be subjected to UV condition so as to allow photopolymerization of the second polymeric material monomer. The as-prepared polymer matrix may be peeled off and optionally dried under room temperature or an elevated temperature. At this stage, a polymer matrix containing the first and the second crosslinked structures is obtained.

Finally, at step 408, the as-obtained polymer matrix may be soaked into an aqueous electrolytic solution containing at least one salt or acid, rendering the polymer matrix conductive. In one example, the polymer matrix may be soaked in a 1M $H_2SO_4$ solution for a predetermined period of time.

In this example, the electrolyte 106 is a polymer matrix of agar and hydrophobic PAAm (i.e. an agar/HPAAm hydrogel). The hydrogel is prepared by forming a mixture of agar (gel strength of >800 g cm$^2$ and melting point of 85-90° C., Sigma-Aldrich Inc.) (20 mg/mL), AAm (98%, TCI Shanghai Inc.)+SMA (Aladdin (Shanghai) Inc.) (30% w/v, where SMA is 1.0 mol % of AAm), Irgacure 2959 (1 mol % of the total monomer), and 7% SDS (Aladdin (Shanghai) Inc.)/0.5M NaCl aqueous solution in a reactor. The reactor was then sealed under $N_2$ protection after three degassing cycles and then gradually heated up to 90° C. in an oil bath for about 10-20 min to dissolve all the reactants in the SDS/NaCl solution. The as-obtained transparent, low viscosity solution was injected into a plastic mold (H=1 mm). Subsequently, the solution was cooled to 4° C. for 30 min to form an agar hydrogel network (i.e. the first crosslinked network).

Photopolymerization reaction was then carried out to form an agar/HPAAm hydrogel under UV light (λ=365 nm wavelength, intensity of 8 W) for 1 h.

The as-prepared hydrogel may be soaked into an aqueous electrolytic solution containing 1M $H_2SO_4$ solution for a predetermined period of time at room temperature. This may allow ion exchange between the internal of hydrogel and the external solution.

The characterization and performance of embodiments of the electrolyte and the energy storage device containing the electrolyte will now be discussed. The electrochemical tests were carried out on an electrochemical working station (CHI760E). The single PPy electrode was measured in a three-electrode configuration with a platinum mesh and a saturated calomel electrode serving as counter electrode and reference electrode, respectively. For the resistance tests of agar/HPAAm hydrogel, the as-synthesized hydrogel was heated to 80° C. for 1 h, and then immersed into 1M $H_2SO_4$ solution for at least 3 h. After being stretched for different cycles, the $H_2SO_4$ treated hydrogel was put between two Cu sheets and connected to an electrochemical work station to measure the electrical resistance.

The crystallinity of the PPy film was investigated by XRD using a Bruker D2 Phaser diffractometer with Cu Kα radiation (λ=1.54 Å). XPS analyses were conducted on an ESCALAB 250 photoelectron spectroscopy (Thermo Fisher Scientific) at $1.2\times10^{-9}$ mbar using Al Kα X-ray beam (1486.6 eV). The XPS spectra were charge-corrected to the adventitious C is peak at 284.6 eV. Raman spectra were measured with a multichannel modular triple Raman system with confocal microscopy at room temperature using a 633 nm laser. The microstructure and morphology of PPy film was characterized by scanning electron microscope (SEM) (JEOL JSM-6355F) with an acceleration voltage of 15 KV.

Figure 5:
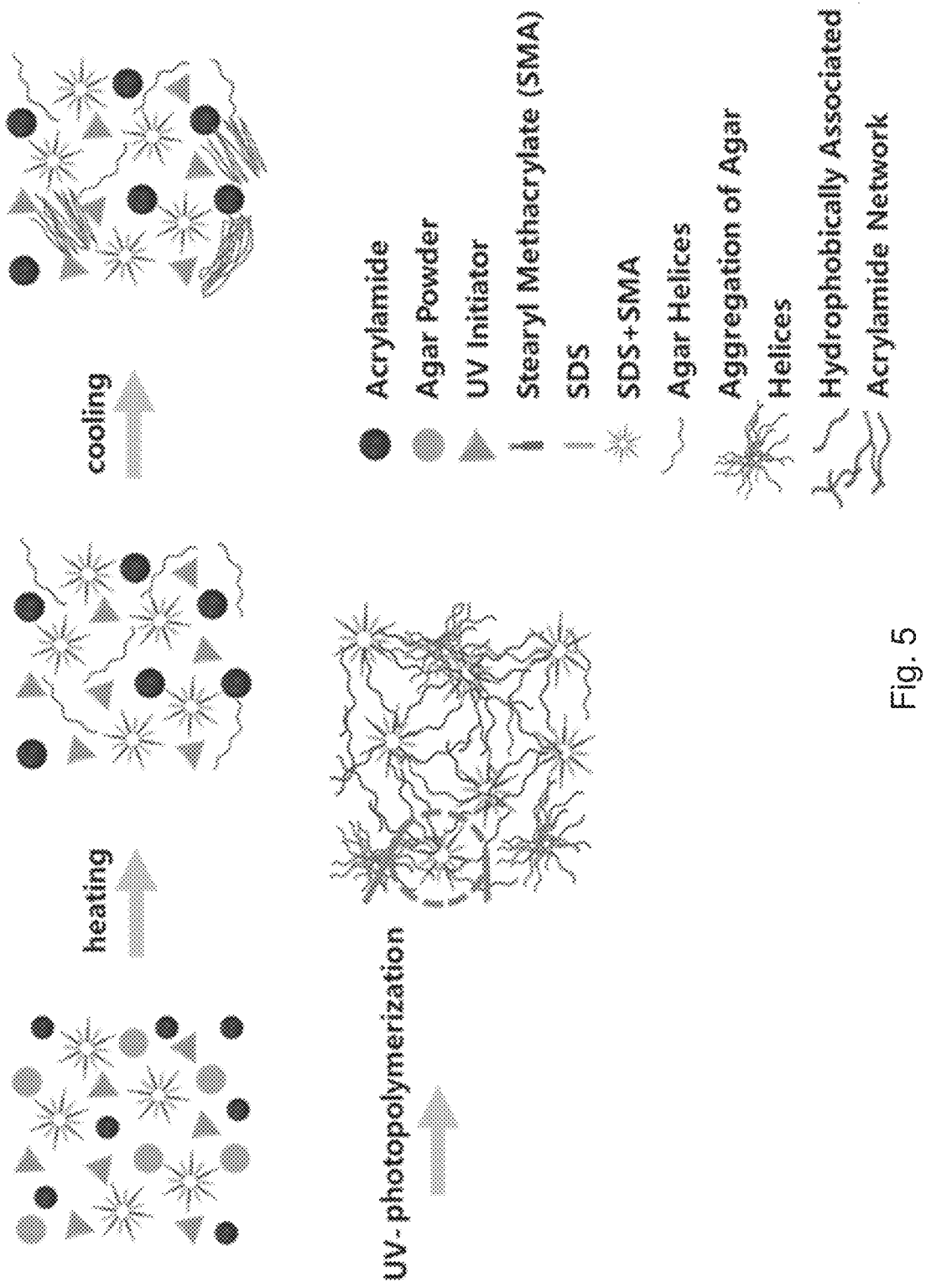
FIG. 5 is a schematic diagram showing the synthetic procedure of the agar/HPAAm hydrogel electrolyte.

With reference to FIG. 5, there are shown a specific example of an agar/HPAAm electrolyte and the method of preparing the same. The preparation method is identical to the aforementioned method 400. As shown in FIG. 5, the stearyl methacrylate (SMA) was used to form polymerizable micelles and the agar was melted into linear macromolecules. During the cooling process, hydrogen bonds began to emerge, leading the linear agar chains to form a first crosslinked network. The unreacted acrylamide (AAm) was then photopolymerized under UV light, forming a second physically crosslinked network with the SMA/SDS micelles by hydrophobic interactions. The strong hydrophobic interactions between alkyl groups of SMA and SDS micelles further allows the two crosslinked networks to infiltrate into each other, constructing an overall framework of the hydrogel.

The self-healing/recovery properties may be accounted for by the physically crosslinks within the structure. Although it is appreciated that physical crosslink is considerably less strong as compared with chemical or chemical-physical hybrid crosslinks, the hydrophobic interactions interpenetrate among the networks such that the interactions may be ruptured and reformed in response to the introduction/removal of mechanical loads. Thus, the whole hydrogel structure may be reconstructed within a short period of time, which greatly improves the mechanical performance, especially the elasticity of the hydrogel.

In addition, the agar/HPAAm hydrogel is insoluble in water or aqueous solutions due to the hydrophobically associated network. This may be advantageous for any stretchable hydrogel electrolytes that require a high water content during operation.

Figure 6A:
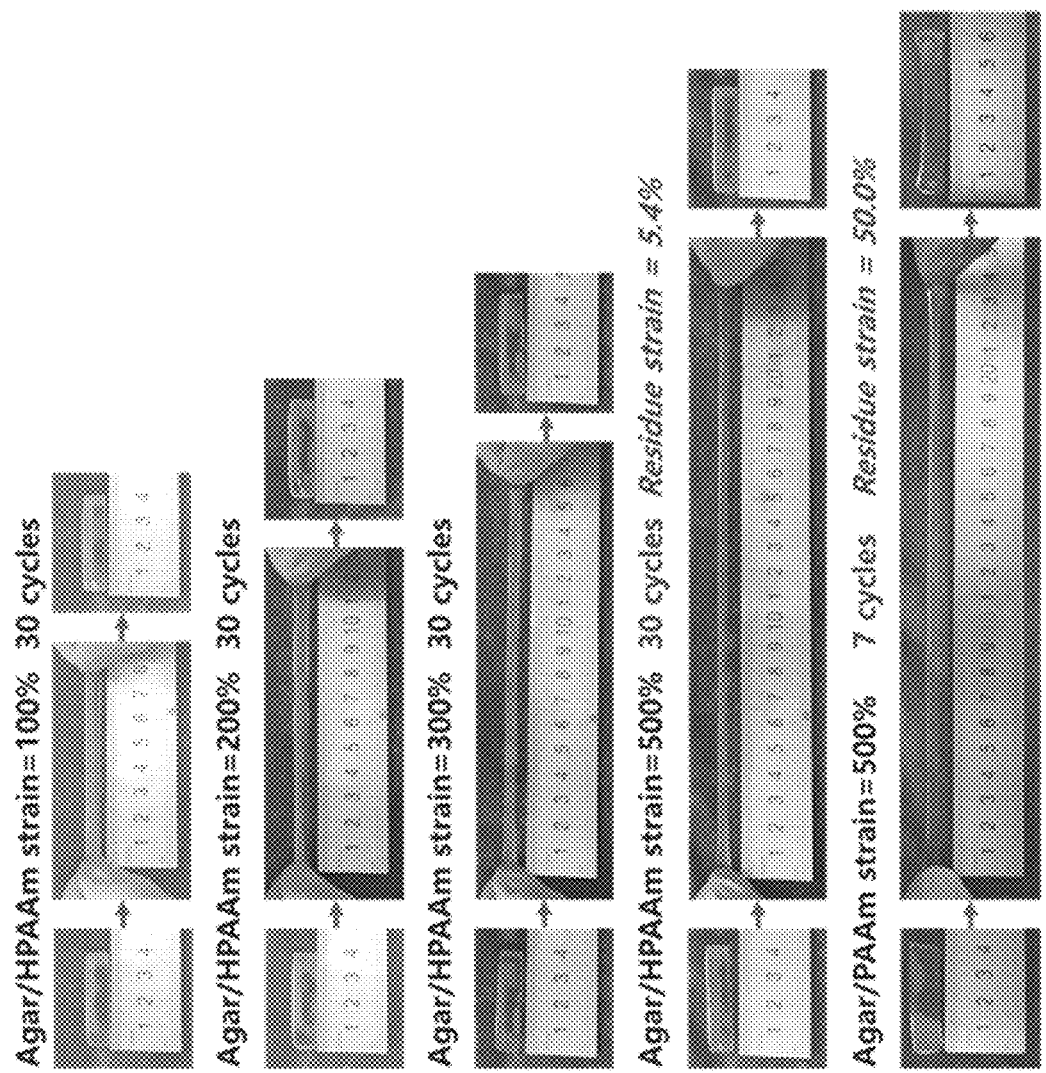
FIG. 6A is a series of optical images showing the recovery performance of the agar/HPAAm hydrogel and agar/PAAm hydrogel under different stretching conditions.
Figure 6B:
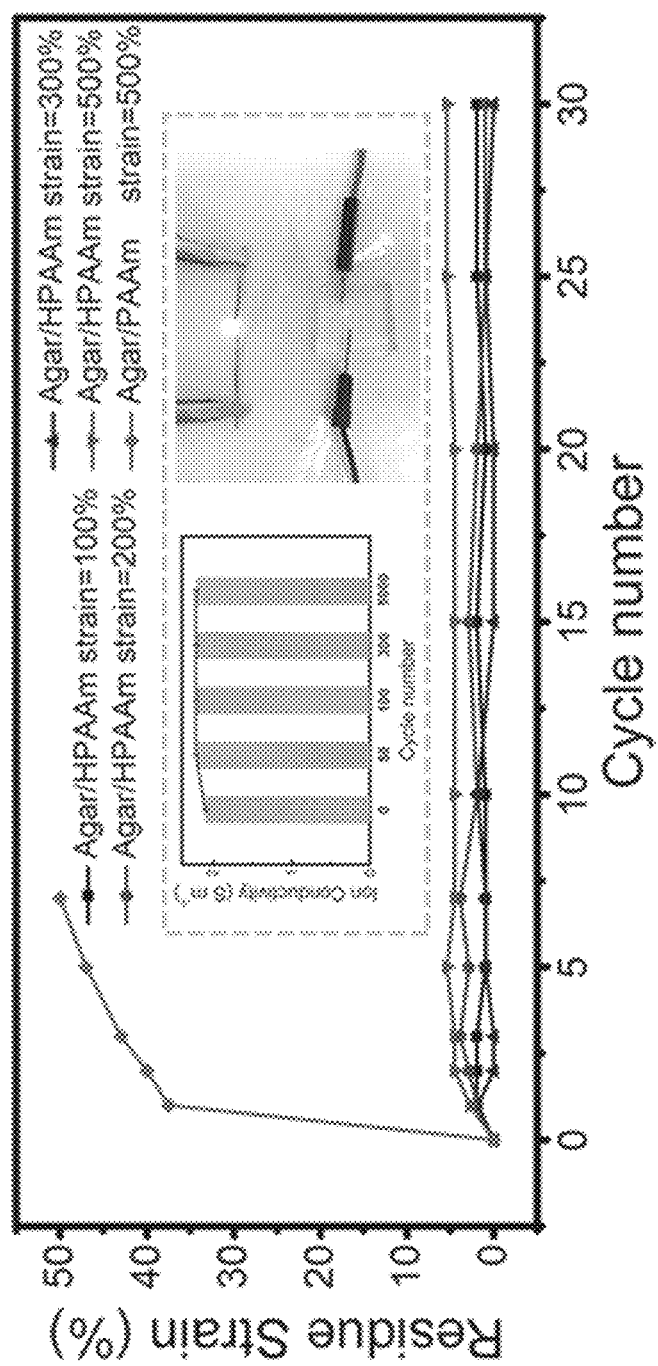
FIG. 6B is a plot of residual strain against cycle number showing the final residual strain of the agar/HPAAm hydrogel and agar/PAAm hydrogel after different stretching strains and different cycles. The inset on the left is a plot of ion conductivity against cycle number showing the ion conductivity of the agar/HPAAm hydrogel after different stretching cycles with 100% strain. The insert on the right is an optical image showing an agar/HPAAm hydrogel after being stretched for many times was used as part of a circuit to light a LED.
Figure 7A:
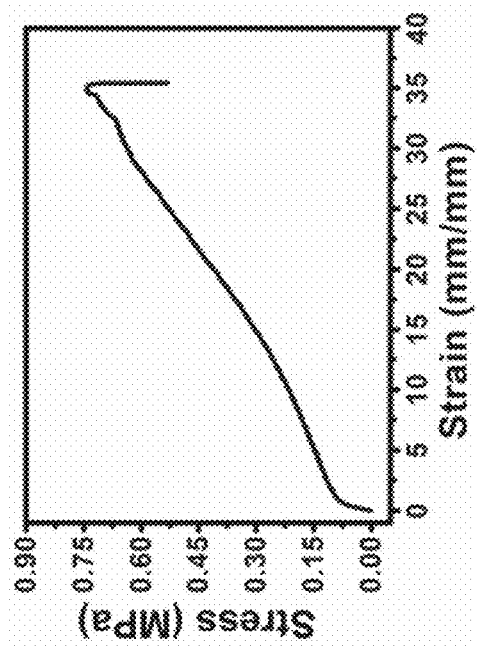
FIG. 7A is a plot of stress against strain showing a tensile curve of the agar/HPAAm hydrogel.

To confirm the superior elasticity of the developed Agar/HPAAm DN hydrogel, a series of tensile tests were conducted. As shown in FIG. 6A, a 4 cm-long hydrogel sample was stretched to different strains ranging from 100% to 500% for 30 cycles. Under the 100% strain, the agar/HPAAm hydrogel recovered quickly with negligible residual deformation. As the stretching strain increased, the final residual strain was increased insignificantly. Even at the 500% elongation, the residual deformation was still less than 10% (FIGS. 6A and 6B), which is much insignificant as compared with the control agar/PAAm hydrogel. In addition, as shown in FIG. 7A, the strain of the agar/HPAAm hydrogel can be as large as 3400%.

Another example stretchable agar/PAAm hydrogel was also used as a control experiment. Upon stretching the agar/PAAm hydrogel to 500% strain, the residual strain was found to be nearly 40% after the first stretching, and the residual strain was even increased to 50% after the $7^{th}$ stretching cycle (FIGS. 6A and 6B), suggesting the poor elasticity of the agar/PAAm hydrogel.

Figure 7B:
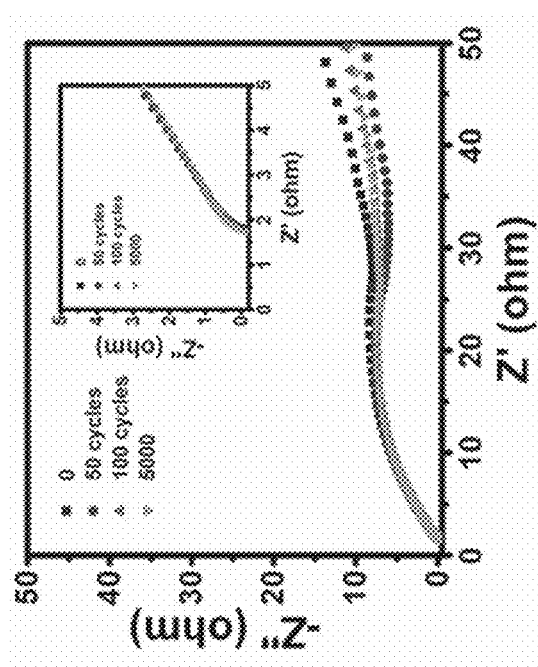
FIG. 7B is an EIS spectra showing the EIS curves of the agar/HPAAm hydrogel after different stretching cycles.

Considering the hydrogel electrolyte is used as electrolyte, the ionic conductivity was also measured. As shown in the left inset of FIG. 6B, the ion conductivity of the agar/HPAAm hydrogel was about 2 $Sm^{-1}$ and kept steady even after 5000 stretching cycles, with only slight fluctuations. This result is also convinced by the electrical impedance spectroscopy (EIS) as shown in FIG. 7B. To further confirm the conductivity, the agar/HPAAm hydrogel after subjecting to 5000 stretching cycles was used as part of the wire to light a LED light, as shown in the right inset of FIG. 6B, suggesting the hydrogel maintained an excellent electrical conductivity after subjecting to a large number of stretching cycles and may be applied in a circuit.

Although the elasticity of a supercapacitor is mainly provided by the hydrogel electrolyte, in view of obtaining a highly elastic and reversibly-stretchable supercapacitor, it is appreciated that a soft electrode may be advantageous in avoiding any induced retardance. A thin pristine conducting polymer film without any inorganic materials involved may be preferable. However, the electrical conductivity of most conducting polymer may not be sufficiently high to achieve excellent electrochemical performances. As such, instead of free-standing pristine polymer film, conducting polymer film may have to be deposited on a conductive substrate to acquire sufficient conductivity. The inventors devise that annealing may effectively enhance electrical conductivity of a free-standing PPy film, subsequently boosting up its electrochemical performances.

The PPy film of the present disclosure is prepared by an electrodeposition method as discussed earlier. The deposited PPy film can be easily peeled off from a substrate after being immersed in ethanol for several minutes. The characterization results of the as-obtained PPy film are shown in FIGS. 8A to 8D.

Figure 8B:
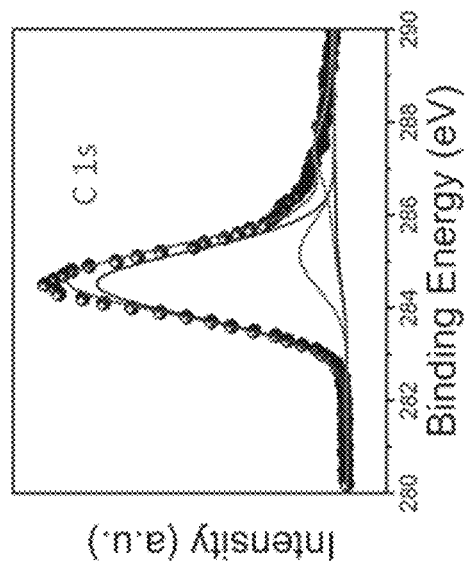
FIG. 8B is a high resolution XPS spectra of FIG. 8A showing the C peak thereof.
Figure 8D:
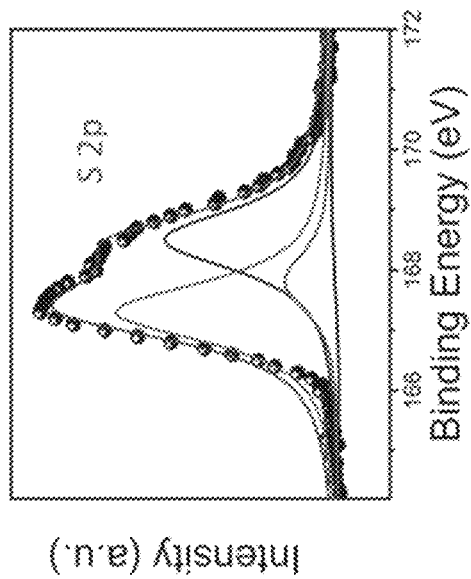
FIG. 8D is a high resolution XPS spectra of FIG. 8A showing the S peaks thereof.
Figure 8A:
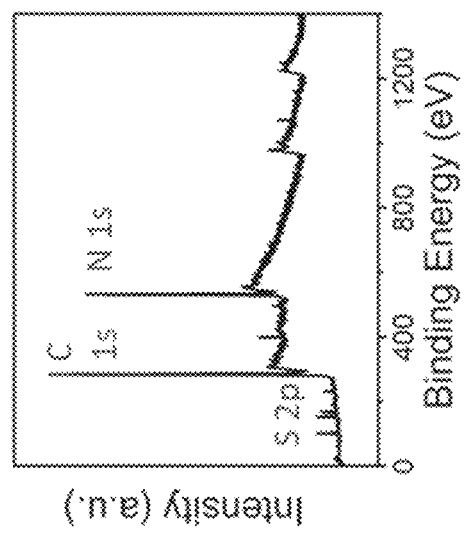
FIG. 8A is a full XPS spectra of the electrodeposited PPy film.
Figure 8C:
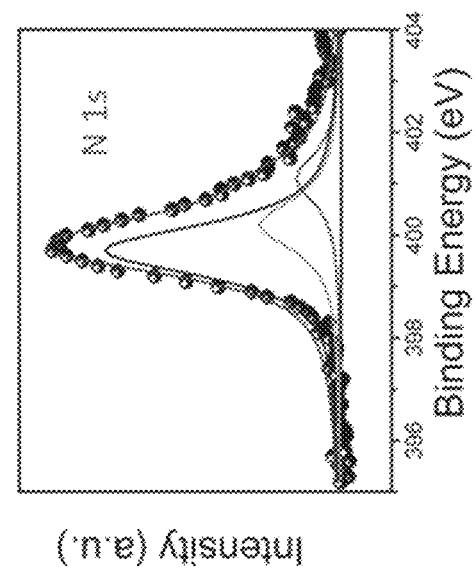
FIG. 8C is a high resolution XPS spectra of FIG. 8A showing the N peak thereof.

As shown in FIG. 8A, the XPS spectra confirms the existence of N after pTSA doping, which greatly contributes to the conductivity of PPy. As shown in FIG. 8B, the C1s core level can be divided into three Gaussian peaks. The α carbons (C—N) and the β carbons (C—C) are located at 285.2 and 284.5 eV, respectively. The peak located at 287.4 eV stands for the C—S, which was also introduced to the PPy film during the pTSA doping. As shown in FIG. 8C, the N1s spectra can be divided into three Gaussian peaks. The strongest peak is located at 399.7 eV, corresponding to the neutral N on the pyrrole ring (—NH—). The lower peaks located at 400.1 and 401.1 eV are related to the basic structure of organic matrix. As shown in FIG. 8D, the S2p spectra is divided into three Gaussian peaks. The peak located at 167.8 eV confirms the existence of S=O, whereas the peaks located at 167.3 and 168.5 eV are attributed to the tetravalent sulfur and hexavalent sulfur, respectively.

To confirm the PPy film is sufficiently soft and flexible to act as a desirable stretchable electrode, the deposition time was strictly controlled. As shown in the FIG. 9A, a short deposition time (e.g. 300s) would make the PPy film too thin and soft to peel off, and the whole film was difficult to be expanded as a plain one. In contrast, a long deposition time (e.g. 900s) would make the PPy film too thick and brittle, which is not soft and flexible enough to fit onto the stretchable hydrogel properly.

Figure 9B:
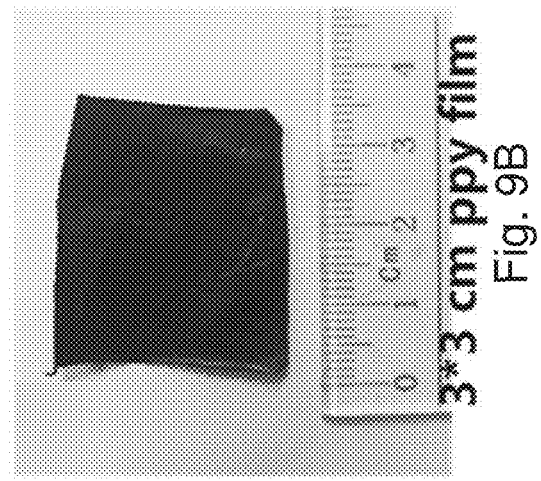
FIG. 9B is an optical image showing a 3 cm×3 cm PPy film.
Figure 9C:
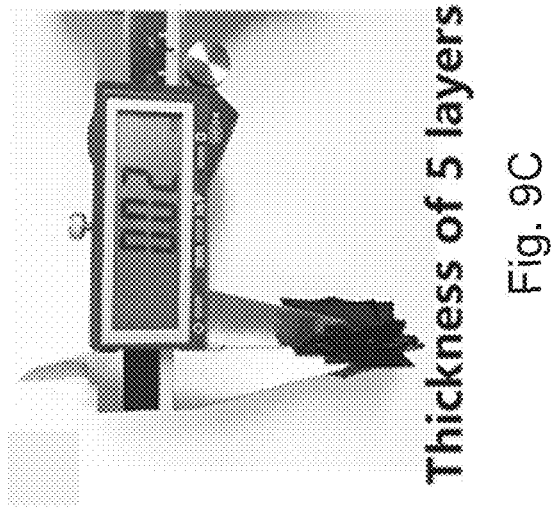
FIG. 9C is an optical image showing the thickness of a 5-layer stacked PPy film with 600 s deposition.
Figure 9A:
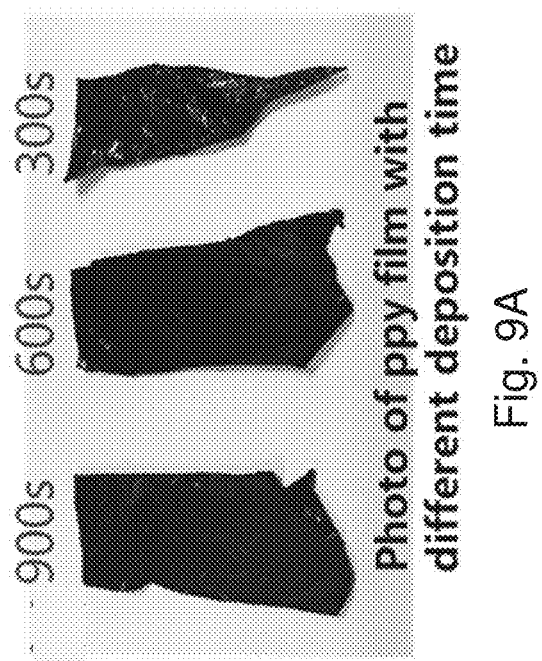
FIG. 9A is an optical image showing the PPy films obtained by different electrodeposition time.

When the deposition time was fixed to be 600s, a good balance between softness and thickness was obtained, thus obtaining a PPy film with sufficient flexibility as well as toughness for subsequent device fabrication. As shown in FIG. 9B, a flat bulky sized free-standing PPy film was obtained. The thickness of the 600s-deposited-PPy film was about 4 μm only (FIG. 9C).

The PPy film was then annealed to further increase its electrical conductivity. With reference to the differential scanning calorimetry (DSC) curve as shown in FIG. 10A, the $T_g$ (glass transition temperature) of the PPy film is 228° C. The annealing temperature was therefore set at 260° C., which is slightly higher than the $T_g$. During the heating process, the messy structure of PPy formed during the electrochemical deposition was slightly loosen, and while cooling, the long polymer chains would rearrange into a more regular manner, leading to a better electrical conductivity.

The XRD spectra as shown in FIG. 10B confirms that the crystallinity improved after annealing. As shown in FIGS. 10C and 10D, the Raman peak at 1578 $cm^{-1}$ was slightly left moved (blue-shifted) to 1576 $cm^{-1}$, suggesting the structural change of the PPy film after annealing.

Figure 10E:
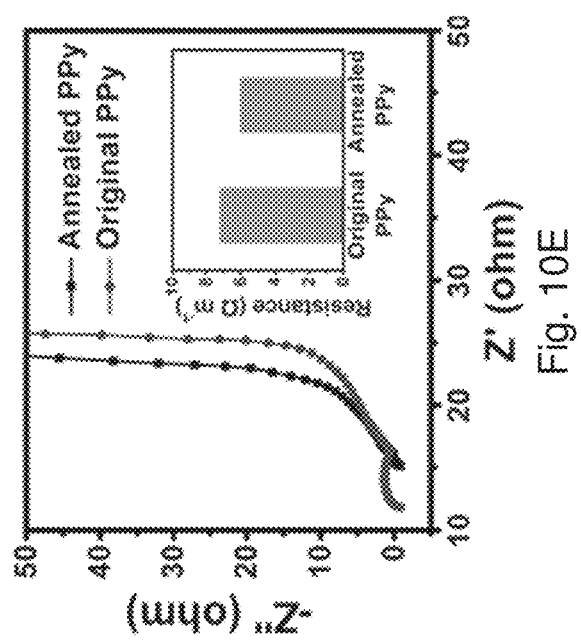
FIG. 10E is an EIS spectra showing the EIS curves of the PPy film before and after annealing. The insert is a bar chart showing the resistance of the PPy film before and after annealing as measured by four-probe resistor.

The electrochemical performance of a single electrode was evaluated in a three-electrode system. As shown in the insert of FIG. 10E, the electrical resistance of the electrode decreases from 7.2 $\Omega cm^{-1}$ to 6.0 $\Omega cm^{-1}$, and the resistance of the whole device also decreases (FIG. 10E), indicating that the positive effect of the annealing process on increasing the electrical conductivity of the PPy film.

Figure 10F:
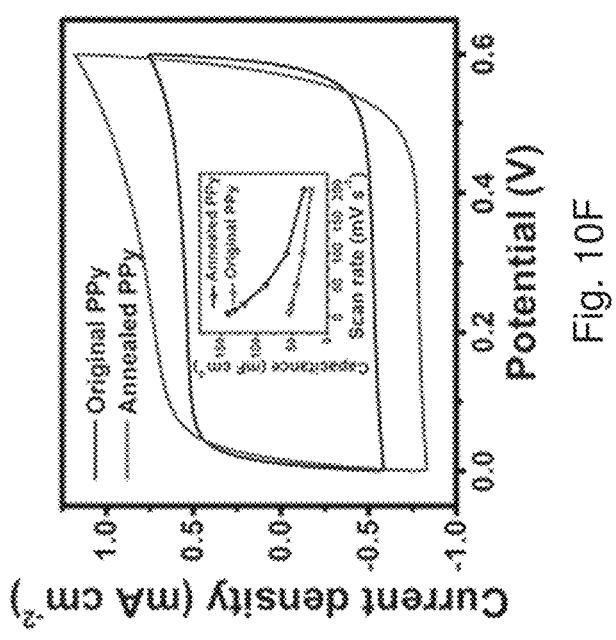
FIG. 10F is a cyclic voltammogram showing the CV curves of the PPy film before and after annealing. The insert is a plot of capacitance against scan rates showing the capacitance change of the pristine and annealed PPy films at different scan rates.

As shown in FIG. 10F, the inset-area of CV curve of the annealed PPy film is obviously increased, which is due to the improvement of the electrical conductivity. The effectiveness of the annealing process carried out at 260° C. on the electrochemical performance of the PPy film was also demonstrated. As shown in the insert of FIG. 10F, the capacitance of the annealed PPy film at different scan rates (from 5 mV $s^{-1}$ to 200 mV $s^{-1}$) was higher than that of the PPy film without being annealed.

The annealed PPy film was further applied in a symmetrical supercapacitor with 1M aqueous $H_2SO_4$ solution as the electrolyte. The performance of the annealed PPy film was investigated and the results were shown in FIGS. 11A to 11C. The CV curves of the annealed PPy film maintained a quasi-rectangular shape in a relatively wide scan range (from 5 mV $s^{-1}$ to 200 mV $s^{-1}$), suggesting a fast charge transportation of the device (FIG. 11A). The symmetric galvanostatic charge-discharge (GCD) curves show a high areal capacitance of 138.3 mF $cm^2$ at a current density of 0.2 mA $cm^2$, which is attributed to the good electrical activity of PPy film (FIG. 11B).

The annealed free-standing PPy film may also work well when it is simply paved on the agar/HPAAm hydrogel. As shown in FIG. 11D, the CV curves still maintain a quasi-rectangular shape. The GCD curves (FIG. 11E) shows an areal capacitance of 79.7 mF $cm^{-2}$ at the same scan rate, which may be induced by the decrease of contact area between the electrolyte and the electrode, as well as the relatively lower ionic conductivity of the solid-state electrolyte. To evaluate the cyclic performance, 4000 charge-discharge cycles were conducted on the supercapacitor, and the capacitance remains 95.2% of the pristine value (FIG. 11F).

Figure 12:
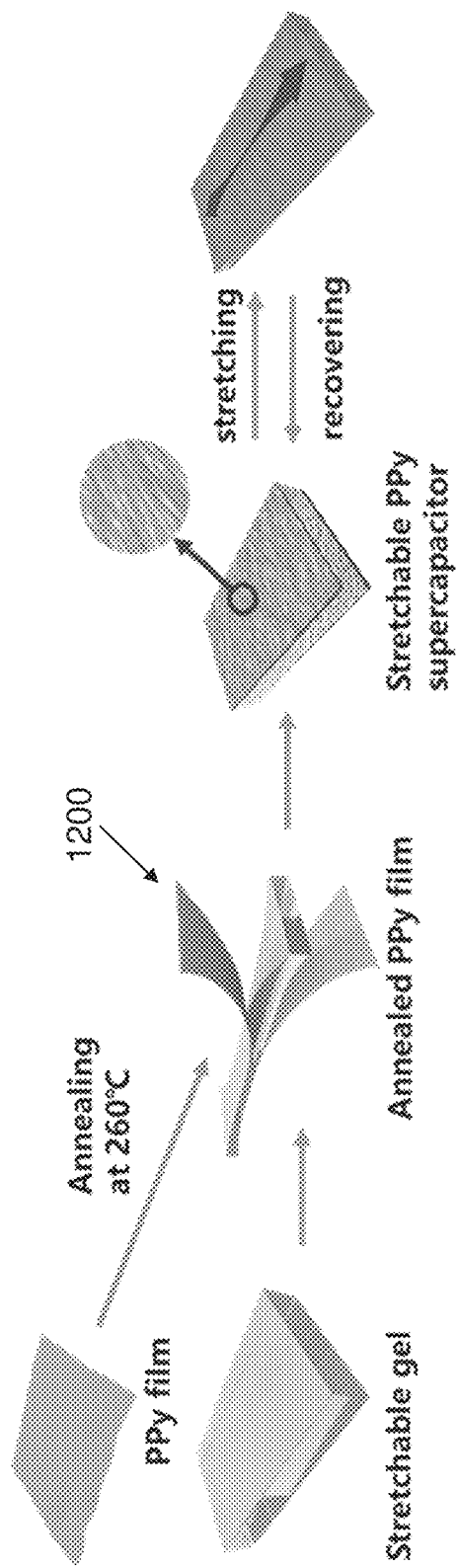
FIG. 12 is a schematic diagram showing fabrication process of a stretchable all-polymer supercapacitor in accordance with one embodiment of the present invention.

With the highly elastic agar/HPAAm DN hydrogel electrolyte and highly soft free-standing PPy film, a reversibly-stretchable supercapacitor 1200 may be fabricated. As shown in FIG. 12, the annealed PPy film was paved onto a pre-stretched agar/HPAAm DN hydrogel, and the whole device was then released from stretching naturally. Since the agar/HPAAm hydrogel is sticky on its surface, the PPy film can easily adhere onto the hydrogel surfaces, forming a wrinkled surface after the hydrogel recover to its original length.

The annealed PPy film is sufficiently tough to endure folding or bending, making the obtained device 1200 stretchable. This also renders the whole device (i.e. supercapacitor 1200) capable of being stretched many times without obvious residual deformations, which suggests an excellent elasticity of the supercapacitor 1200.

Figure 13A:
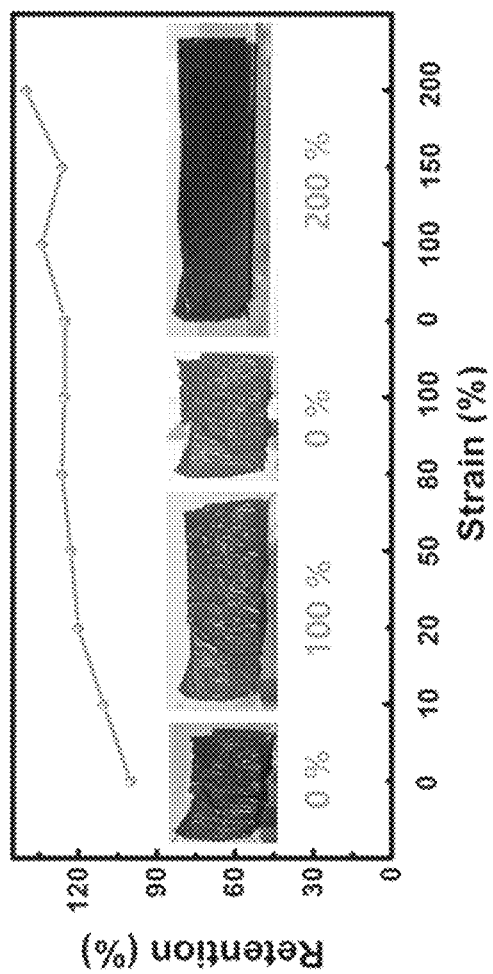
FIG. 13A is a plot of retention against strain showing the capacitance retention of the supercapacitor of FIG. 12 at different strains. The insert is a series of optical images showing the appearance of the supercapacitor at different strains.

The capacitance retention of the supercapacitor 1200 in response to the strain changes is shown in FIG. 13A. During the first stretching cycle from 0% to 100%, the wrinkled surface expanded, leading to an increase of the contact area between the electrodes and the electrolyte. The capacitance therefore was increased to 125.4% of the original value. When the supercapacitor returns to its original length, the retention decreased slightly to 125.1%, suggesting the increased contact area is remained.

Figure 13B:
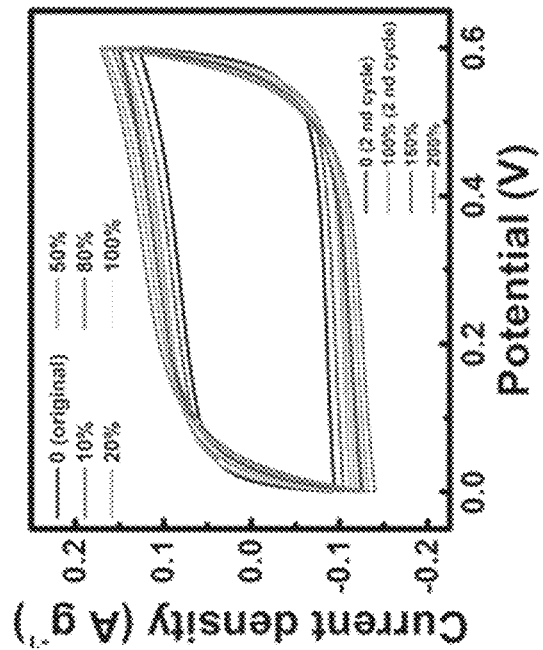
FIG. 13B is a cyclic voltammogram showing the CV curves of the supercapacitor of FIG. 12 at different strains.

The stretching strain was further increased to 200% during the second stretching process. As shown in FIG. 13A, the capacitance retention reached 140.1% of the original value. The CV curves at different strains (FIG. 13B) constantly presented a similar quasi-rectangular shape, suggesting a stable electrochemical performance and a low electrical resistance of the whole device 1200 during the stretching processes.

Figure 13C:
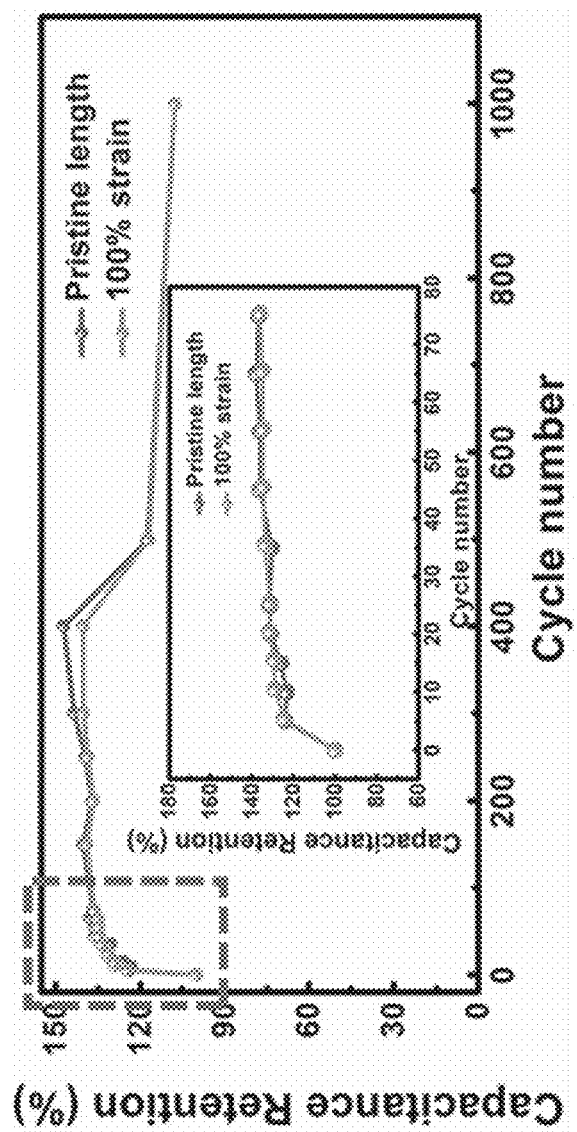
FIG. 13C is a plot of capacitance retention against cycle number showing the capacitance retention of the supercapacitor of FIG. 12 at different stretching cycles. The insert is an enlarged plot of FIG. 13C with cycle numbers of 0 to 80.

To further demonstrate the excellent elasticity and stable electrochemical performance of the supercapacitor 1200, reversible stretching tests were performed on the supercapacitor. The supercapacitor was subjected to 1000 stretching-recovery cycles with an applied strain of 100%. As shown in FIG. 13C, during the first 20 cycles, the capacitance increased quickly, this is mainly because of the activation and infiltration of the PPy film. After the initiation, the performance of the supercapacitor became stable, with slight fluctuations.

In particular, as shown in the insert of FIG. 13C, during the first 80 cycles, there was a small capacitance difference between the conditions of pristine length and 100% elongation. This result suggests that, the contact area between the PPy film and the electrolyte increases at the stretching state, resulting in a slightly improved capacitance. The capacitance begins dropping after 400 cycles, which may be induced by the inner aging of PPy film and the loss of water in the hydrogel since the whole device was exposed in the air at room temperature and normal humidity.

Figure 13D:
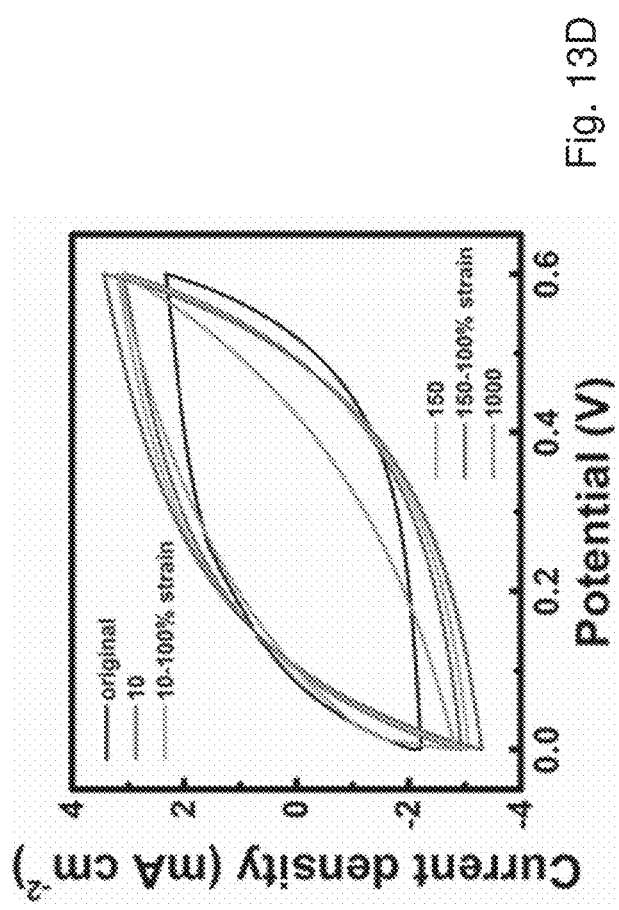
FIG. 13D is a cyclic voltammogram showing the CV curves of the supercapacitor of FIG. 12 after different stretching cycles at 0 or 100% strain.

As shown in FIG. 13D, the shape of the CV curves of the supercapacitor 1200 still maintained even after 1000 stretching cycles. In addition, the capacitance of the supercapacitor after 1000 stretching cycles was highly comparable to the initial value (FIG. 13C).

Figure 14B:
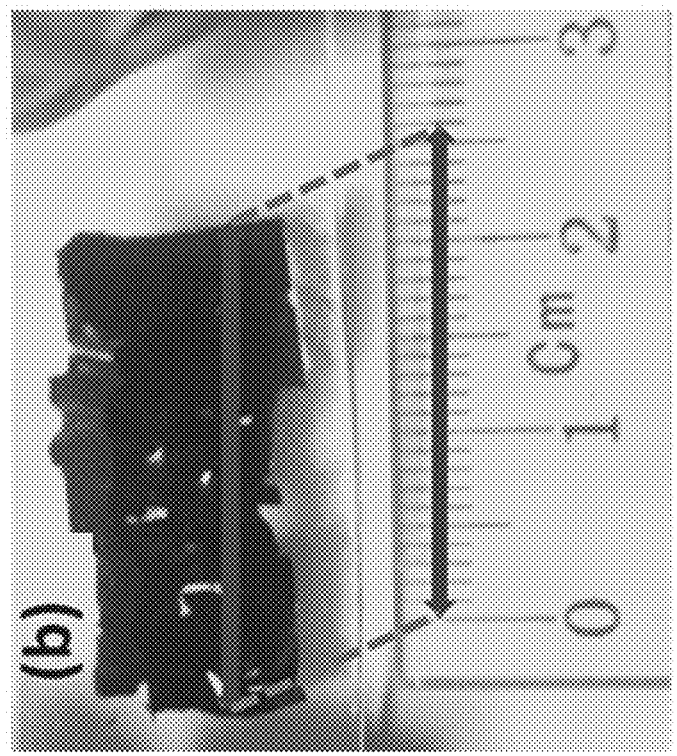
FIG. 14B is an optical image showing the length of the supercapacitor of FIG. 12 after 1000 stretching cycles.
Figure 14A:
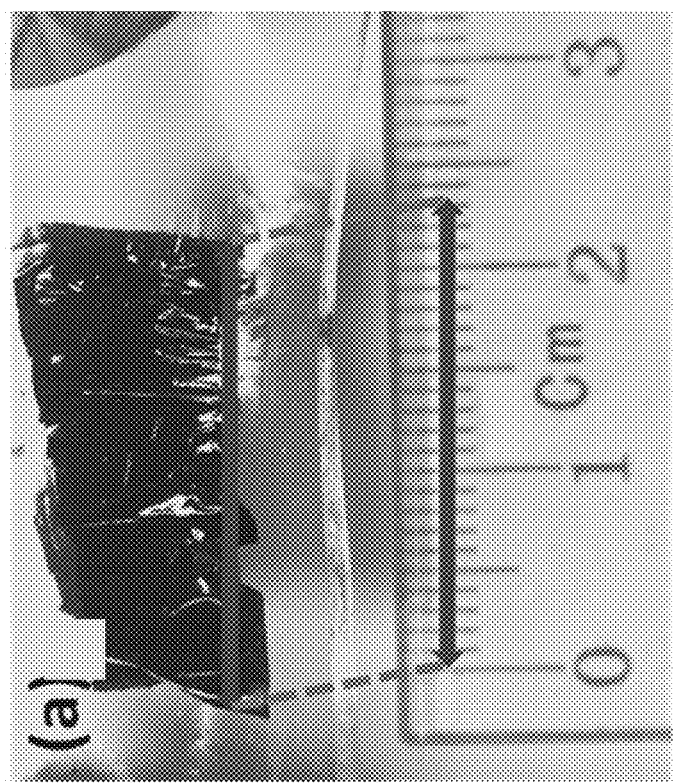
FIG. 14A is an optical image showing the original length of the supercapacitor of FIG. 12.

The residual strain of the whole device 1200 after subjecting to 1000 stretching cycles was only 10.2% of the original length (FIGS. 14A and 14B). It is believed to be as a result of 1) the highly elastic agar/HPAAm hydrogel, which combines the merits of high ionic conductivity of hydrogel and the elastomer-like elasticity; and 2) the all-polymer design, where the soft free-standing PPy film electrodes render a low hindrance to the reversible stretching processes, and a superior interfacial binding interaction between the electrode and hydrogel electrolyte.

The energy storage device of the present invention such as the supercapacitor 1200 is advantageous since it is not only stretchable, but also capable of returning to its original length after several hundred or even a thousand times of stretching-recovery cycles. In other words, the device of the present disclosure possesses a high resistance to deformation fatigue, in particular to repeated stretching applied onto the device, which suggests a high durability and wearability of the device.

In addition, the supercapacitor exhibits a high and stable electrochemical performance even after the aforementioned stretching. For example, the supercapacitor was found to have and maintain a high capacitance of 79.7 mF $cm^2$ after subjecting 1000 stretching cycles. Furthermore, the scaling up of the device is very cost effective as it does not require a water-free and/or oxygen-free environment for assembling the supercapacitor.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An energy storage device, comprising:
 an anode and a cathode, each of which include an annealed conductive polymer having a wrinkled surface;
 an electrolyte sandwiched between the anode and the cathode, the electrolyte includes a polymer matrix including:
  a first crosslinked structure defined by a plurality of agar chains forming at least one hydrogen bond between each adjacent pair of the agar chains;
  a second crosslinked structure defined by a plurality of polyacrylamide chains forming at least one hydrophobic interaction with a crosslinking agent comprising a polymerizable micelle, the polymerizable micelle includes poly(stearyl methacrylate) and sodium dodecyl sulfate; and
  a third crosslinked structure defined by the plurality of agar chains and the polyacrylamide chains forming at least one hydrophobic interaction, through the polymerizable micelle, among adjacent pairs of the agar chains and the polyacrylamide chains, or defined by the adjacent pairs of agar chains and the polyacrylamide chains that are intercrossing and intertwining with each other; and
 an electrolytic solution of a sulfuric acid solution retained by the polymer matrix;
 wherein the combination of the anode, the cathode, and the electrolyte is arranged to elastically deform when subjected to an external mechanical load applied thereto.

2. The energy storage device according to claim 1, wherein the crosslinking agent further includes a surfactant, wherein the surfactant is sodium dodecyl sulfate (SDS) forming a micelle with poly(stearyl methacrylate).

3. The energy storage device according to claim 1, wherein the second crosslinked structure dissipates energy when subjected to the external mechanical load thereby maintaining the elasticity of the electrolyte.

4. The energy storage device according to claim 3, wherein the second crosslinked structure dissipates energy by rupturing the hydrophobic interactions within the structure when subjected to the external mechanical load; and restoring the interactions when the load is removed.

5. The energy storage device according to claim 1, wherein the first crosslinked structure is polyacrylamide.

6. The energy storage device according to claim 1, wherein the second crosslinked structure is agar.

7. The energy storage device according to claim 1, wherein the conductive polymer is selected from the group consisting of polypyrrole, polyacetylene, polyphenylene vinylene, polythiophene and polyphenylene sulfide.

8. The energy storage device according to claim 1, wherein the conductive polymer is annealed to enhance electrical conductivity thereof.

9. The energy storage device according to claim 1, wherein the combination of the anode, the cathode, and the electrolyte elastically deforms in a way of stretching when subjected to the external mechanical load applied to thereto.

10. The energy storage device according to claim 9, wherein the electrolyte substantially maintains its elasticity after subjecting to stretching for at least 500 times.

11. The energy storage device according to claim 1, wherein the device substantially maintains its elasticity after subjecting to stretching for at least 500 times.

12. The energy storage device according to claim 1, wherein the device is a supercapacitor.

* * * * *